July 27, 1937. W. S. GREENE 2,088,515
LIQUID SEPARATOR
Filed Dec. 28, 1936
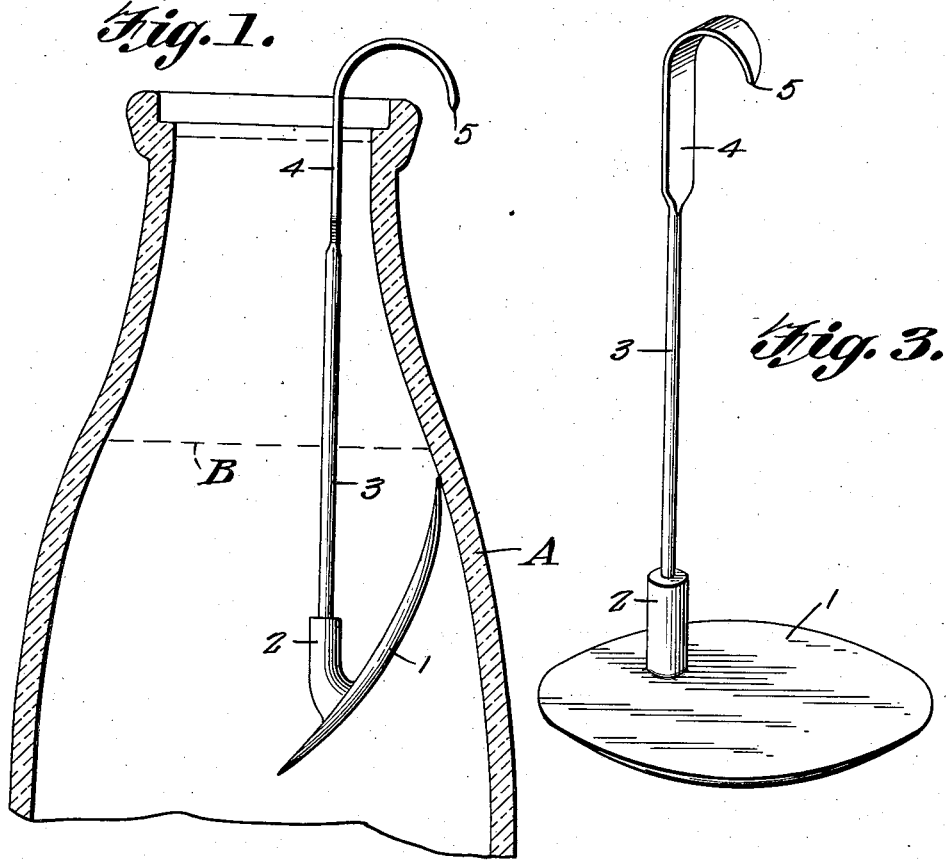
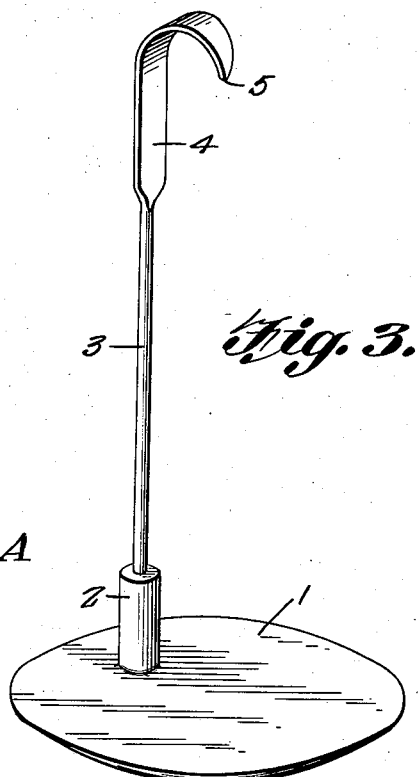
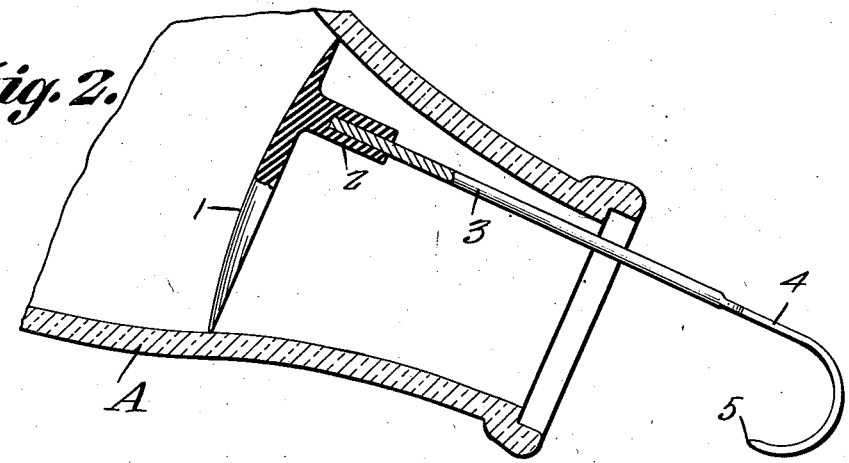
William S. Greene,
INVENTOR Patented July 27, 1937

2,088,515

UNITED STATES PATENT OFFICE 2,088,515

LIQUID SEPARATOR

William S. Greene, Cranston, R. I.

Application December 28, 1936, Serial No. 118,001

1 Claim. (Cl. 210—51.5)

This invention relates to liquid separators, and its general object is to provide a device of that character which is primarily designed for use in a bottle to separate cream from the milk therein so that the cream can be readily poured from the bottle without fear of the milk commingling therewith.

A further object of the invention is to provide a separator that is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a view illustrating the manner of applying my separator within a milk bottle of the usual construction, so as to not materially disturb the cream.

Figure 2 is a similar view with the separator partly in section and illustrates the arrangement thereof for separating the cream from the milk, with the bottle inverted to pour the cream therefrom.

Figure 3 is a perspective view of the separator per se.

Referring to the drawing in detail, the letter A indicates a milk bottle of the usual construction and the dotted line indicated by the letter B in Figure 1 represents what is generally termed the cream line.

The separator which forms the subject matter of the present invention includes a disk shaped body 1 which is preferably provided with a convexed lower surface or bottom, and a flat top. In any event, the body is formed from flexible material such as rubber and has formed on and rising eccentrically therefrom for disposal adjacent to the edge thereof, a nipple 2, as best shown in Figure 2. The nipple is also made from flexible material such as rubber, and the nipple and the body may be molded into a single unit.

The nipple is provided with a bore extending centrally therein for the purpose of receiving the shank 3 of a handle 4, the shank being fixed within the bore, as will be apparent, and is in the form of a rod for the major portion of its length while the remaining or upper portion thereof is flattened to provide the handle which is bent upon itself in hook formation, to provide a convenient gripping means in applying and removing the separator with respect to the bottle, and the handle terminates in a reduced free end to provide a penetrating point 5 for use in removing the cap of the bottle as will be apparent.

In the use of my separator, it will be obvious from Figures 1 and 2 that the body is lowered within the contents of the bottle with the edge thereof diametrically opposed to the nipple in contact with the wall of the bottle for disposing the body at an angle, as shown in Figure 1, so as to prevent the body from materially disturbing the cream. When the body is disposed below the cream line B, it is moved to the position of Figure 2, or at the juncture of the cream with the milk, with the edge of the body contacting the wall, thence the bottle is inverted to the position of Figure 2, and the cream poured therefrom. It will be obvious that very little if any milk will be mixed with the cream, as the latter is not materially disturbed when placing the device within the bottle and the body acts as a stopper for the milk to prevent the passage thereof from the bottle.

The flat portion of the handle below the hook thereof, as well as the hook portion provides a surface for advertising matter which may be stamped thereon or otherwise applied thereto, and of course advertising matter may likewise be placed upon the body when molding the same, as will be apparent.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A separator for use in a bottle and comprising a flexible disk shaped body for disposal between cream and milk in the bottle to separate the same, said body having a convexed bottom and a flat top to provide a feathered edge, a nipple formed on and rising eccentrically from the body and having a bore therein, a handle including a shank fixed in the bore and rising therefrom, and said handle having a flat upper end disposed in hooked formation and terminating in a pointed free end.

WILLIAM S. GREENE.